United States Patent
Sakaguchi

(10) Patent No.: US 10,131,256 B2
(45) Date of Patent: Nov. 20, 2018

(54) BACK FRAME FOR VEHICLE SEAT

(71) Applicant: TOYOTA BOSHOKU KABUSHIKI KAISHA, Aichi (JP)

(72) Inventor: Wataru Sakaguchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/804,496

(22) Filed: Nov. 6, 2017

(65) Prior Publication Data

US 2018/0126883 A1 May 10, 2018

(30) Foreign Application Priority Data

Nov. 9, 2016 (JP) .................. 2016-218937

(51) Int. Cl.
*B60N 2/20* (2006.01)
*B60N 2/22* (2006.01)
*B60N 2/68* (2006.01)
*B60N 2/02* (2006.01)

(52) U.S. Cl.
CPC ............ *B60N 2/68* (2013.01); *B60N 2/0232* (2013.01); *B60N 2002/0236* (2013.01)

(58) Field of Classification Search
CPC . B60N 2/68; B60N 2/0232; B60N 2002/0236
USPC ... 297/354.12, 361.1–362.14, 378.1, 378.12, 297/378.14
See application file for complete search history.

(56) References Cited

U.S. PATENT DOCUMENTS

| | | | | |
|---|---|---|---|---|
| 5,823,499 A | * | 10/1998 | Ito | B60N 2/067 248/429 |
| 6,322,146 B1 | * | 11/2001 | Fisher, Jr. | B60N 2/0232 297/362.11 |
| 6,623,077 B1 | * | 9/2003 | Piaulet | A47C 1/0242 297/362.11 X |
| 7,328,939 B2 | * | 2/2008 | Moriyama | B60N 2/0232 297/362.11 X |
| 7,497,520 B2 | * | 3/2009 | Assmann | B60N 2/2252 297/362 |
| 7,837,266 B2 | * | 11/2010 | Lehmann | B60N 2/225 297/362.12 |
| 8,517,470 B2 | * | 8/2013 | Roth | B60N 2/20 297/362.12 X |

(Continued)

FOREIGN PATENT DOCUMENTS

JP 2016-49801 4/2016

*Primary Examiner* — Rodney B White
(74) *Attorney, Agent, or Firm* — Greenblum & Bernstein, P.L.C.

(57) ABSTRACT

Provided is a new back frame for a vehicle seat that takes into consideration a case where a large load acts on the back frame from a seat width direction. The back frame comprises a first side frame, a second side frame, a transmission rod, and a resin-made pressure-receiving spacer. The transmission rod extends in an extending direction from the first side frame toward the second side frame and comprises a leading end closest to the second side frame in the extending direction. The pressure-receiving spacer is coupled to the second side frame at a position facing the leading end. The transmission rod transmits a load acting on the first side frame to the leading end. The pressure-receiving spacer is configured to receive the load from the leading end.

8 Claims, 10 Drawing Sheets

(56) References Cited

U.S. PATENT DOCUMENTS

| | | | | |
|---|---|---|---|---|
| 9,604,559 B2* | 3/2017 | Yoo | ................ | B60N 2/666 |
| 2005/0006920 A1* | 1/2005 | Moriyama | ........... | B60N 2/0232 |
| | | | | 296/65.08 |
| 2009/0146478 A1* | 6/2009 | Sakamoto | ............ | B60N 2/2231 |
| | | | | 297/362.14 |
| 2010/0201174 A1* | 8/2010 | Ito | ................ | B60N 2/0232 |
| | | | | 297/362 |
| 2014/0125101 A1* | 5/2014 | Hong | ................ | B60N 2/66 |
| | | | | 297/284.4 |
| 2014/0361594 A1* | 12/2014 | Thiel | ................ | B60N 2/20 |
| | | | | 297/362 |
| 2016/0046211 A1* | 2/2016 | Assmann | ............. | B60N 2/2356 |
| | | | | 297/361.1 |
| 2016/0059752 A1 | 3/2016 | Kishida et al. | | |
| 2016/0355104 A1* | 12/2016 | Kim | ................ | B60N 2/0232 |

\* cited by examiner

BACK FRAME FOR VEHICLE SEAT

CROSS-REFERENCE TO RELATED APPLICATIONS

This application claims the benefit of Japanese Patent Application No. 2016-218937 filed on Nov. 9, 2016 with the Japan Patent Office, the entire disclosure of which is incorporated herein by reference.

BACKGROUND

The present disclosure relates to a back frame applied to a vehicle seat that has a seatback for supporting the back of a seat occupant, and configuring a frame of the seatback.

The back frame for a vehicle seat is configured to have two side frames as described in, for example, Japanese Unexamined Patent Application Publication No. 2016-49801. Each side frame is a strength member that is disposed on one side in a seat width direction and extends in a substantially up-down direction.

SUMMARY

In one aspect of the present disclosure, it is preferable that a new back frame for a vehicle seat is provided that takes into consideration a case, for example, where a large load acts on the back frame from a seat width direction.

The present disclosure provides a back frame applied to a vehicle seat having a seatback. The back frame configures a frame of the seatback. The back frame comprises a first side frame extending in a substantially up-down direction, a second side frame spaced apart from the first side frame in a seat width direction and extending in the substantially up-down direction, a transmission rod extending in an extending direction from the first side frame toward the second side frame, and a resin-made pressure-receiving spacer. The transmission rod comprises a leading end closest to the second side frame in the extending direction, and configured to transmit a load acting on the first side frame to the leading end. The pressure-receiving spacer is coupled to the second side frame at a position facing the leading end, has a load-receiving portion facing the leading end in the extending direction, and is configured to receive the load from the leading end. The load-receiving portion comprises at least two peripheral holes depressed toward the second side frame. The at least two peripheral holes are arranged substantially along an inner peripheral edge of the leading end projected onto the load receiving portion.

Accordingly, the load acting on the first side frame is transmitted to the second side frame via the transmission rod and the pressure-receiving spacer. Therefore, a back frame for a vehicle seat can be obtained that can withstand a large load acting on the back frame from the seat width direction.

The load transmitted to the pressure-receiving spacer via the transmission rod acts on the load receiving portion of the pressure-receiving spacer that faces the leading end in the extending direction of the transmission rod. For this reason, the load receiving portion parallel to a load direction needs to have a sufficient thickness to withstand the load.

When a thickness of the load receiving portion is significantly different from that of other portions, however, mold shrinkage occurs in the load receiving portion during resin molding. It may be difficult to ensure sufficient mechanical strength.

On the other hand, in the present disclosure, a portion of the pressure-receiving spacer that faces the leading end, that is, the load receiving portion, comprises at least two peripheral holes. The at least two peripheral holes are arranged substantially along the inner peripheral edge of the transmission rod projected onto the load receiving portion.

As a result, the thickness of the load receiving portion can be inhibited from being significantly different from that of other portions, and mold shrinkage can be inhibited. Therefore, it is possible to ensure sufficient mechanical strength in the resin-made load receiving portion.

Note that the present disclosure may be configured as follows.

Intervals between the at least two peripheral holes adjacent to each other in an arrangement direction may be substantially the same. This makes it possible to reliably inhibit mold shrinkage.

The load receiving portion may further comprise at least one center hole. The at least one center hole is provided closer to a centroid side of a figure drawn by the inner peripheral edge than the at least two peripheral holes.

In addition, intervals (A1 to A12) between the at least one center hole and the at least two peripheral holes adjacent to each other may be substantially the same. This makes it possible to reliably inhibit mold shrinkage. "Centroid" refers to a position where a sum of area moments is zero.

It should be noted that the above "substantially the same interval" means that at least two intervals are substantially the same. It is not necessary that all the intervals are substantially the same.

The present disclosure may further comprise a metal plate disposed between the pressure-receiving spacer and the leading end. The transmission rod may be a hollow pipe. The plate may be fixed to the pressure-receiving spacer by a rod-like mechanical fastener.

Furthermore, the mechanical fastener may be inserted into the at least one center hole. As a result, the load receiving portion is reinforced with metal, so that sufficient mechanical strength can be ensured.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

Figure 1:
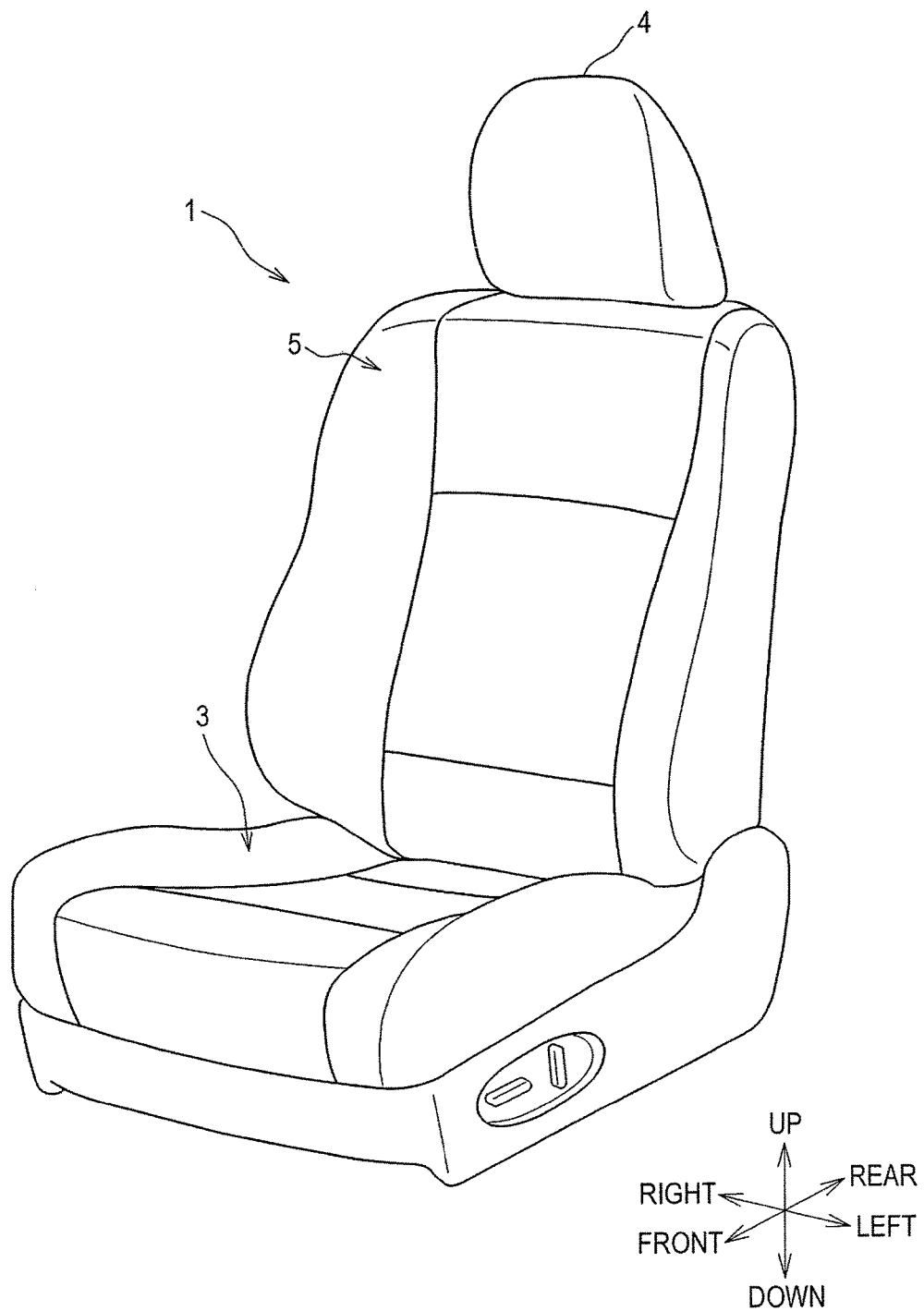
FIG. 1 is an external view of a vehicle seat according to an embodiment.

An "embodiment" described below shows an example embodiment within the technical scope of the present disclosure. In other word, matters specifying the invention described in the claims are not limited to the specific configuration, structure, etc. shown in the embodiment below.

Arrows and the like indicating directions attached to respective figures are provided to make it easy to understand the relationship between the respective figures. Arrows and the like (directions) attached to the respective figures do not limit the scope of the present disclosure.

At least one member or portion is provided for a member or portion at least described with a reference numeral, except when that member or portion is explicitly described as "one member" or the like. In other words, two or more such members may be provided.

First Embodiment

In the present embodiment, a front seat of an ordinary passenger car will be described. Directions in the following description represent directions in a state in which a vehicle seat according to the present embodiment is assembled in the vehicle.

1. Overview of Vehicle Seat

As shown in FIG. 1, the vehicle seat 1 has at least a seat cushion 3 and a seatback 5. The seat cushion 3 is a portion for supporting the buttocks and the like of a seat occupant. The seatback 5 is a portion for supporting the back of a seat occupant. The seatback 5 can swing (recline) with respect to the seat cushion 3 in a longitudinal direction of the seat 1.

Figure 2:
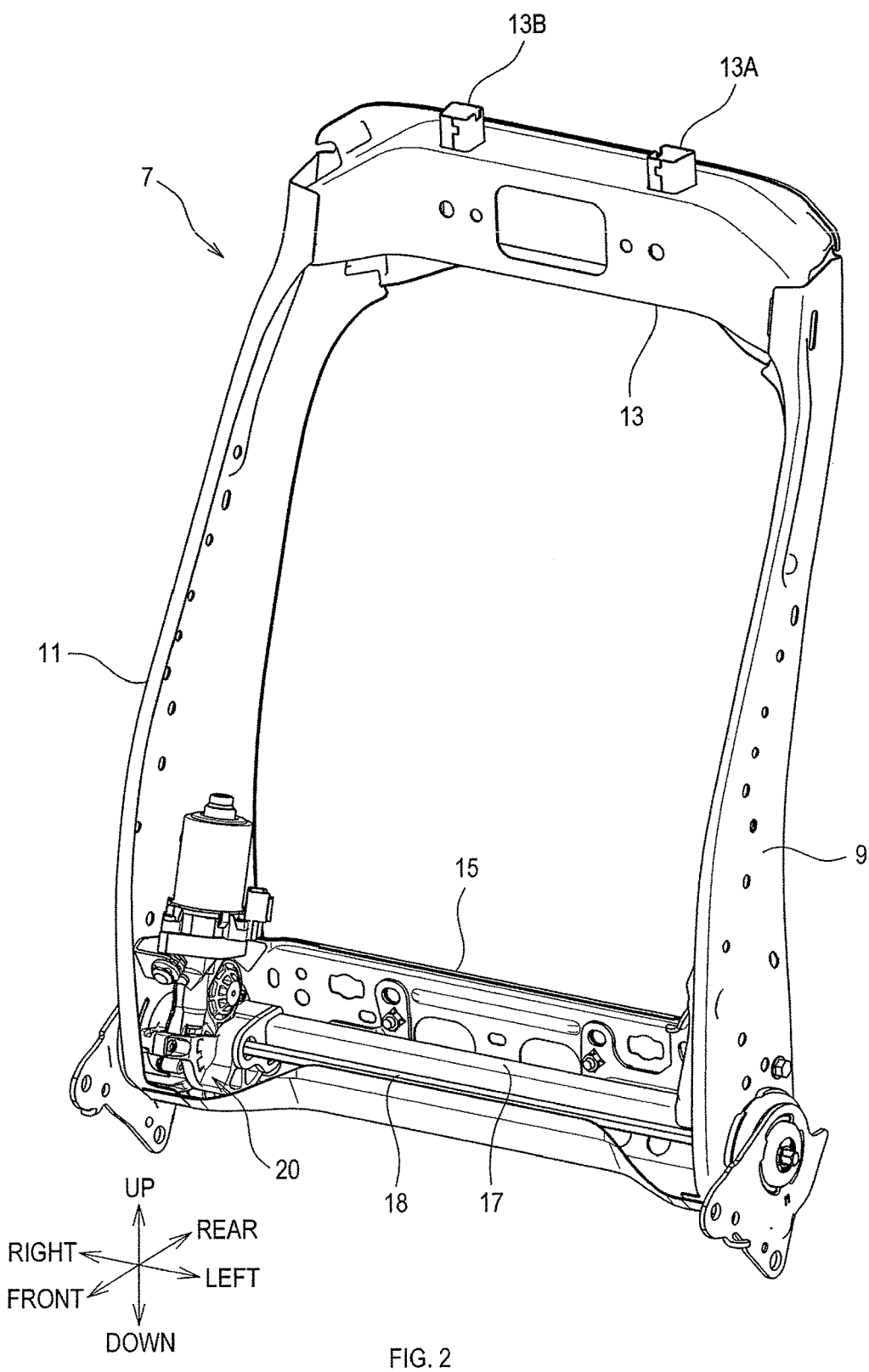
FIG. 2 is an external view of a back frame according to the embodiment.
Figure 3:
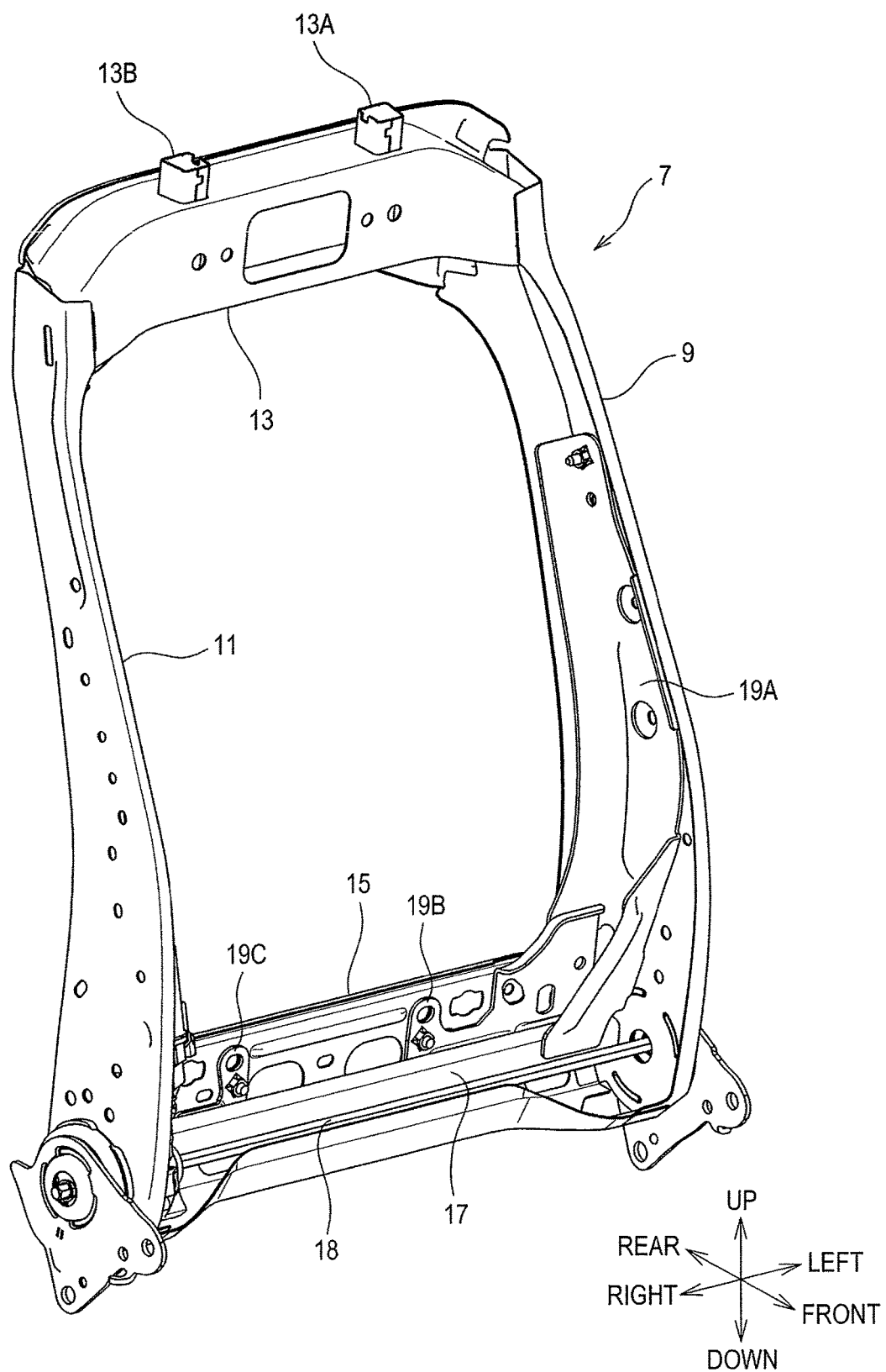
FIG. 3 is an external view of the back frame according to the embodiment.

A back frame 7 shown in FIGS. 2 and 3 configures a frame of the seatback 5 and is swingably coupled to a cushion frame (not shown). The cushion frame configures a frame of the seat cushion 3.

The back frame 7 has at least two side frames 9, 11, an upper panel 13, and a lower panel 15. Each of the side frames 9, 11 extends in a substantially up-down direction and is disposed on one side in a seat width direction.

Note that the seat width direction according to this embodiment coincides with a left-right direction of the vehicle. Hereinafter, the side frame 9 disposed at one end in the seat width direction is also referred to as a first side frame 9. The side frame 11 disposed at the other end in the seat width direction is also referred to as a second side frame 11.

The upper panel 13 extends in the seat width direction and couples upper end portions of the side frames 9, 11. The upper panel 13 is a panel-shaped frame of which the cross-section orthogonal to an extending direction thereof is substantially C-shaped. Note that the upper panel 13 according to the present embodiment is a panel member having an open cross-section with a rear portion of the seat opened.

Two headrest supports 13A, 13B are fixed to the upper panel 13. The two headrest supports 13A, 13B are tubular members (square tube shape in the present embodiment) for supporting a headrest 4 (see FIG. 1). The headrest 4 is a member for supporting the head of a seat occupant.

The lower panel 15 extends in the seat width direction and couples lower end portions of the side frames 9, 11. The lower panel 15 is a panel-shaped member of which cross-sectional shape orthogonal to an extending direction thereof is substantially C-shaped or J-shaped.

The lower panel 15 according to the present embodiment has an open cross-sectional shape that is configured in a J-shape with a front upper portion of the seat opened. The two side frames 9, 11, the upper panel 13 and the lower panel 15 are made of metal. The two side frames 9, 11, the upper panel 13, and the lower panel 15 are coupled and fixed to each other by joining means such as welding or mechanical fasteners such as screws.

A transmission rod 17 extending in an extending direction from the first side frame 9 to the second side frame 11 is disposed between the two side frames 9, 11. The transmission rod 17 is a columnar member for transmitting a load acting on the first side frame 9 (hereinafter referred to as a side impact load) toward the second side frame 11, that is, transmitting the load to a leading end 17A of the transmission rod 17, that is closest to the second side frame 11 in the extending direction. The transmission rod 17 according to this embodiment is a hollow pipe.

Figure 4:
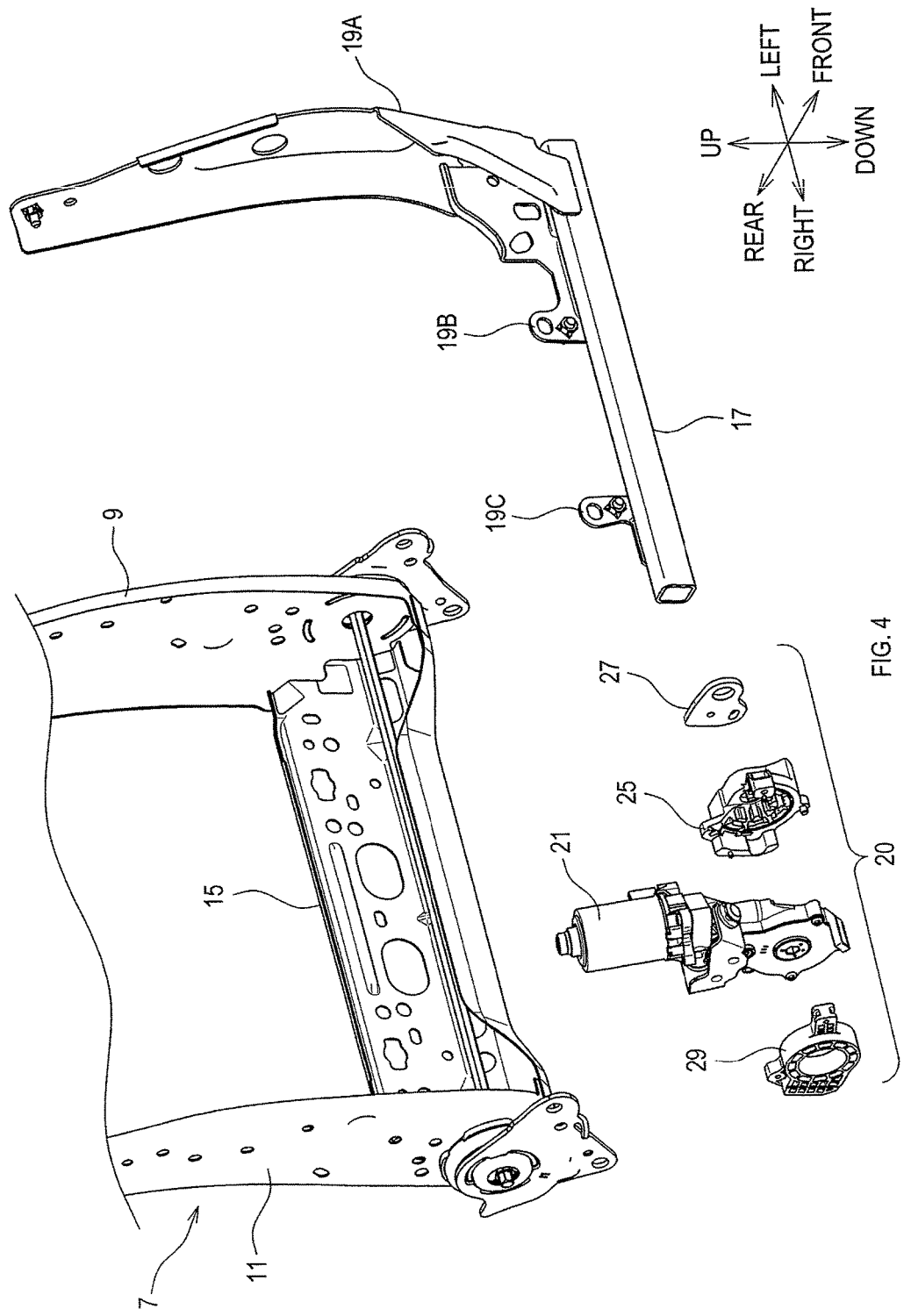
FIG. 4 is an exploded perspective view of the back frame according to the embodiment.

As shown in FIG. 4, a frame bracket 19A is fixed to one end in the extending direction of the transmission rod 17. A portion of the frame bracket 19A extending in the up-down direction is fixed to the first side frame 9.

Panel brackets 19B, 19C are fixed to a portion of the transmission rod 17 facing the lower panel 15. The panel brackets 19B, 19C are fixed to the lower panel 15. In other words, the transmission rod 17 is fixed to the back frame 7 via the frame bracket 19A and the two panel brackets 19B, 19C.

In the present embodiment, the frame bracket 19A and the two panel brackets 19B, 19C are fixed to the first side frame 9 and the lower panel 15 by mechanical fasteners (not shown) such as screws, respectively.

Each of the brackets 19A to 19C is fixed to the transmission rod 17 by welding. In the present embodiment, the first side frame 9 is located on the end side in a vehicle width direction, that is, on the side of an entrance door (not shown), and the second side frame 11 is located on the center side in the vehicle width direction.

2. Driving Device for Reclining 2.1 Overview of Driving Device

Figure 5:
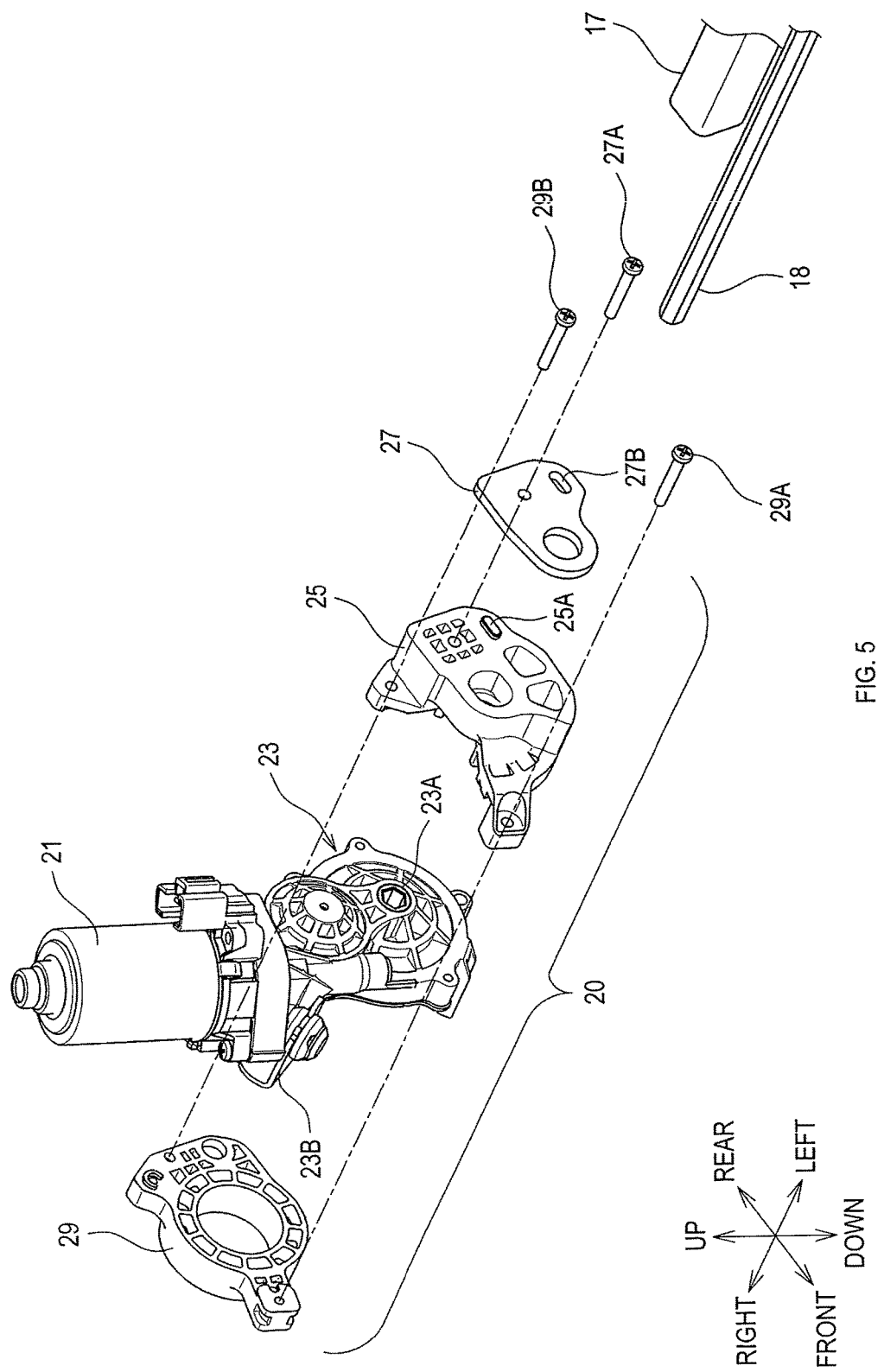
FIG. 5 is an exploded perspective view of a driving device according to the embodiment.

As shown in FIG. 2, a driving device 20 is attached to the back frame 7 and generates a swinging force. The swinging force is a force for swinging the back frame 7 with respect to the cushion frame. As shown in FIG. 5, the driving device 20 has at least an electric motor 21, a deceleration mechanism 23, a first pressure-receiving spacer 25, a plate 27, and a second pressure-receiving spacer 29.

The electric motor 21 generates a driving force which is a source of the swinging force. The deceleration mechanism 23 reduces a rotational output of the electric motor 21 so as to increase the driving force (torque). The deceleration mechanism 23 according to the present embodiment turns the rotational output generated by the electric motor 21 by approximately 90 degrees and outputs the turned rotational output.

Figure 6:
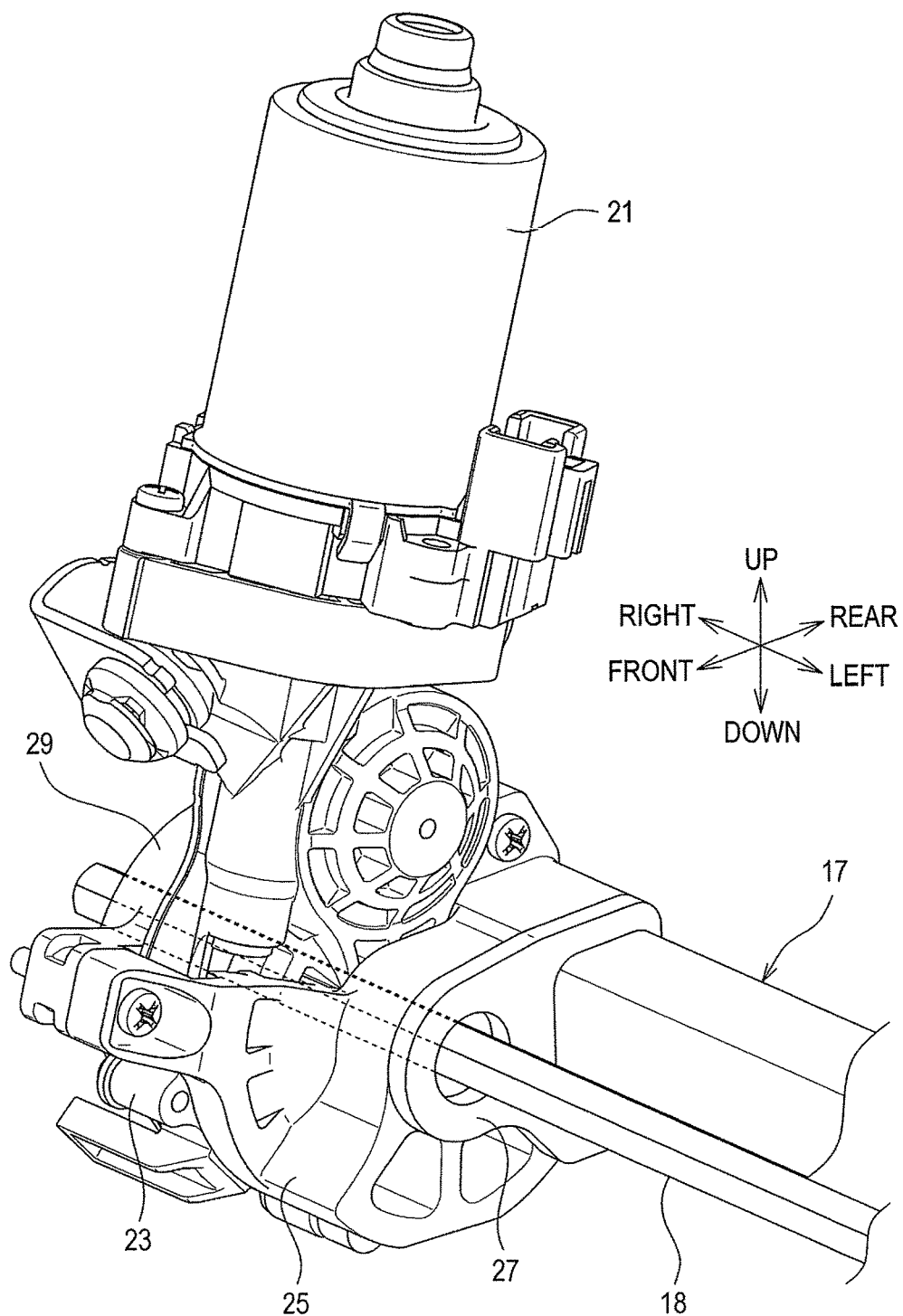
FIG. 6 is a view showing the driving device and a transmission rod according to the embodiment in an assembled state.

A polygonal through hole 23A is provided in an output portion of the deceleration mechanism 23. A coupling rod 18 having a cross-sectional shape congruent with the through hole 23A penetrates the through hole 23A (see FIG. 6). The coupling rod 18 transmits the rotational output generated by the electric motor 21 to the two side frames 9, 11.

Figure 7:
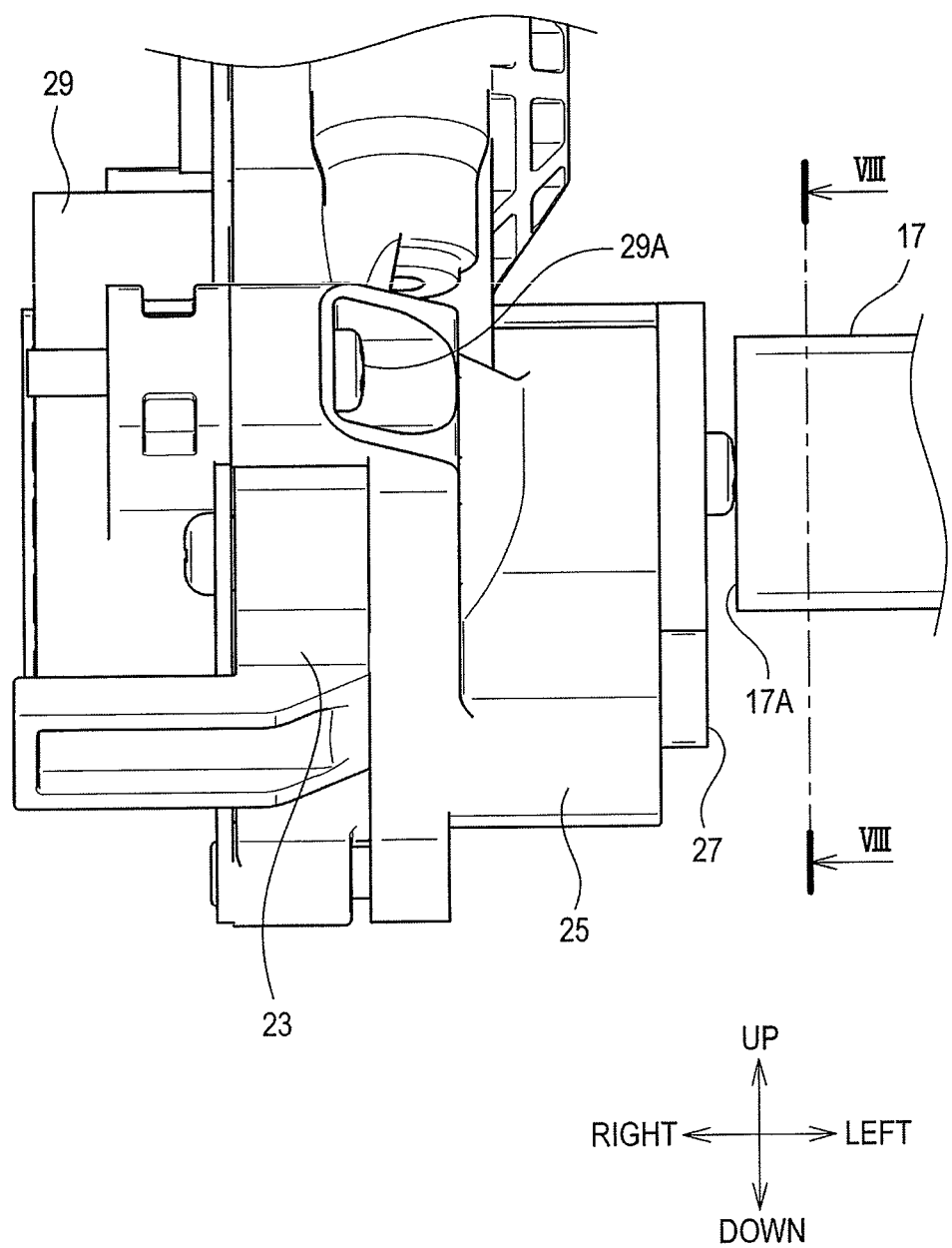
FIG. 7 is a view showing the driving device and the transmission rod according to the embodiment in an assembled state.

As shown in FIG. 7, the first pressure-receiving spacer 25 is a resin-made member fixed to the deceleration mechanism 23 at a position facing the leading end 17A in the extending direction of the transmission rod 17. The first pressure-receiving spacer 25 is a pressure-receiving member that receives a load transmitted via the transmission rod 17.

The first pressure-receiving spacer 25 is fixed to the deceleration mechanism 23 so that the deceleration mechanism 23 is held between the first pressure-receiving spacer 25 and the second pressure-receiving spacer 29. In other words, the first pressure-receiving spacer 25 is disposed on the side of the transmission rod 17 (the first side frame 9) with respect to the deceleration mechanism 23.

The second pressure-receiving spacer 29 is made of the same resin as the first pressure-receiving spacer 25, and is disposed on the side opposite to the transmission rod 17 (on the side of the second side frame 11) with respect to the deceleration mechanism 23. The first pressure-receiving spacer 25 and the second pressure-receiving spacer 29 are fastened and fixed to each other by screws 29A and 29B (see FIG. 5).

The second pressure-receiving spacer 29, in a state of being in contact with or close to the second side frame 11, faces the second side frame 11. The driving device 20 is fixed to the second side frame 11 via a bracket 23B (see FIG. 5) provided in a housing of the deceleration mechanism 23. In other words, the first pressure-receiving spacer 25 is indirectly fixed to the second side frame 11 via the bracket 23B or the like.

The plate 27 is a metal plate member disposed on the side of the transmission rod 17 of the first pressure-receiving spacer 25, and directly faces the leading end 17A in the extending direction of the transmission rod 17. In other words, the plate 27 is disposed between the first pressure-receiving spacer 25 and the transmission rod 17.

In the present embodiment, as shown in FIG. 7, the leading end 17A in the extending direction of the transmission rod 17 is separated from the plate 27. Therefore, when the transmission rod 17 is displaced to the side of the plate 27 by the side impact load and the leading end 17A comes into contact with the plate 27, the side impact load is transmitted to the second side frame 11 through the first pressure-receiving spacer 25 and the second pressure-receiving spacer 29.

In the present embodiment, the first pressure-receiving spacer 25 and the second pressure-receiving spacer 29 are fastened to each other and hold the deceleration mechanism 23 therebetween. However, the first pressure-receiving spacer 25 and the second pressure-receiving spacer 29 are not fixed to the deceleration mechanism 23. Therefore, most of the side impact load transmitted to the first pressure-receiving spacer 25 is transmitted not to the deceleration mechanism 23 but to the second side frame 11 via the second pressure-receiving spacer 29.

2.2 Plate Fixing Structure

Figure 8:
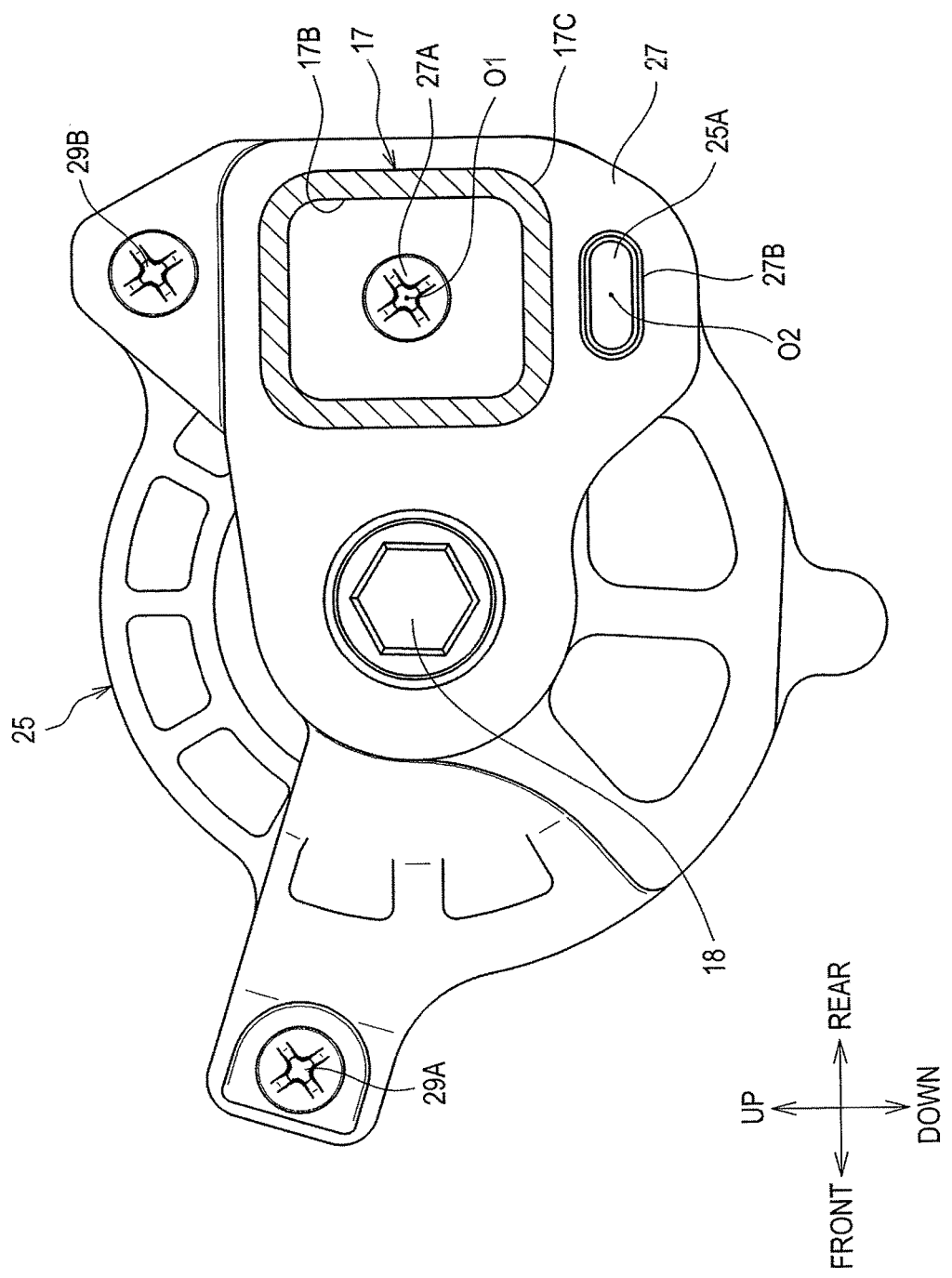
FIG. 8 is a sectional view taken along the line VIII-VIII of FIG. 7.

As shown in FIG. 8, the plate 27 is fixed to the first pressure-receiving spacer 25 by a P screw (pan head screw) 27A. The P screw 27A is an example of a mechanical fastener. The P screw 27A is located in an inner peripheral edge 17B of the transmission rod 17 projected onto the plate 27.

Specifically, a center position O1 of a cross-section of the P screw 27A substantially coincides with a centroid of a figure drawn by the inner peripheral edge 17B. The centroid refers to a position where area moments of the figure drawn by the inner peripheral edge 17B are balanced.

As shown in FIG. 5, the first pressure-receiving spacer 25 is provided with a protrusion 25A protruding toward the plate 27. The plate 27 has a hole portion 27B into which the protrusion 25A is fitted.

As shown in FIG. 8, the protrusion 25A and the hole 27B are located outside an outer peripheral edge 17C of the transmission rod 17 projected onto the plate 27. A cross-sectional shape of the protrusion 25A and the hole portion 27B according to the present embodiment is oval. The "oval" of the present disclosure includes an ellipse, a spindle shape, and the like.

A longitudinal direction of the oval is not limited. The "longitudinal direction of the oval" according to this embodiment is substantially parallel to a tangential direction of the outer peripheral edge 17C at an intersection of an imaginary line, which passes the center position O1 of the cross-section of the P screw 27A as well as a center position O2 of a cross-section of the protrusion 25A, and the outer peripheral edge 17C.

2.3 Structure of First Pressure-Receiving Spacer

Figure 9:
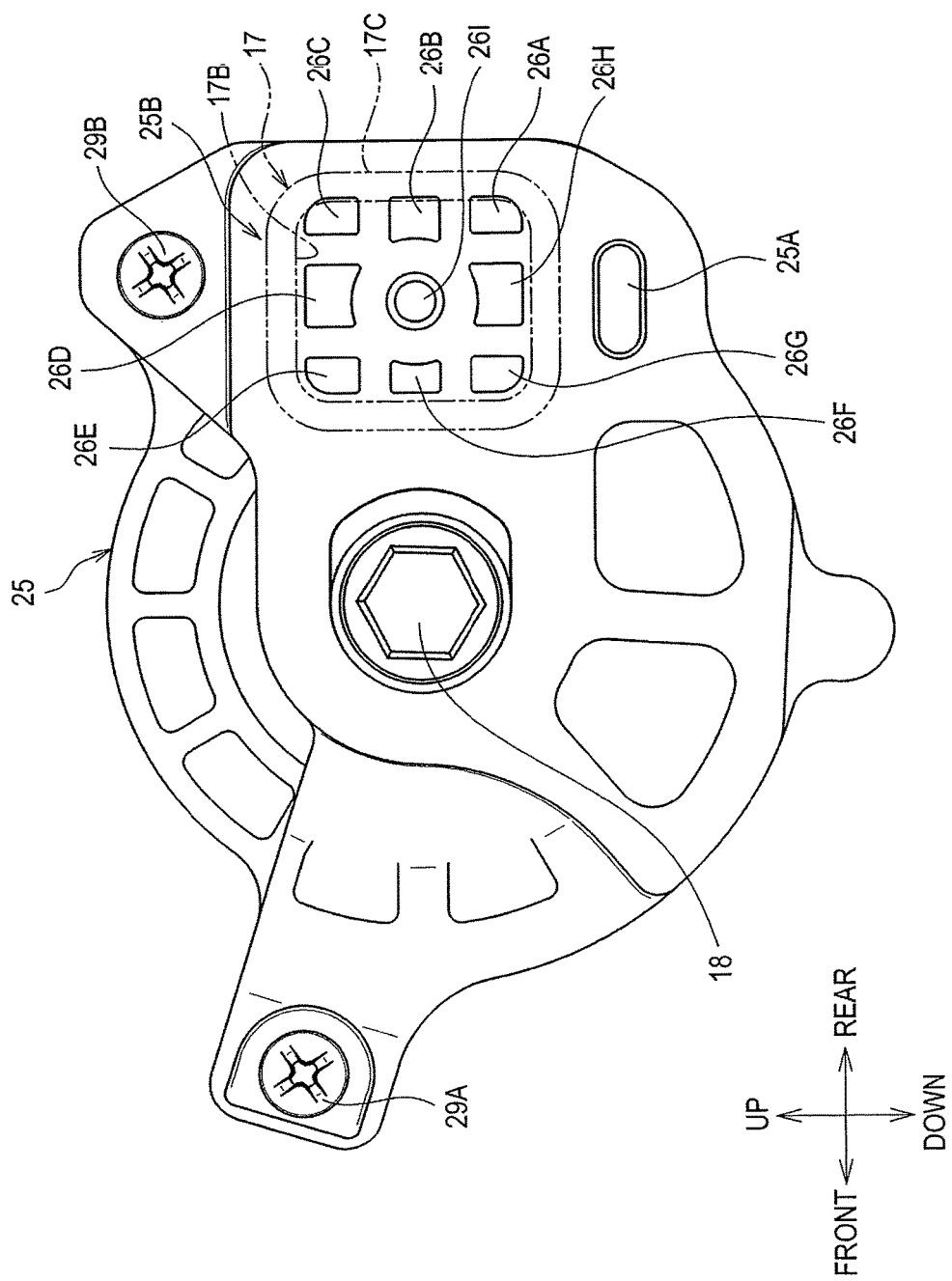
FIG. 9 is a view showing a load receiving portion of a first pressure-receiving spacer according to the embodiment.

As shown in FIG. 9, a portion (hereinafter referred to as a load receiving portion 25B) of the first pressure-receiving spacer 25, which faces the leading end 17A in the extending direction of the transmission rod 17, has a plurality of holes 26A to 26I depressed toward the second side frame 11, that is, toward the deceleration mechanism 23. The holes 26A to 26I may be either through holes penetrating to the deceleration mechanism 23 or blind holes not penetrating to the deceleration mechanism 23.

The load receiving portion 25B is a region including a range surrounded by the "outer peripheral edge 17C of the transmission rod 17" projected onto a portion of the first pressure-receiving spacer 25 facing the plate 27. At least two (the holes 26A to 26H in the present embodiment) of the holes 26A to 26I are arranged substantially along the inner peripheral edge 17B of the transmission rod 17 projected onto the load receiving portion 25B.

"The holes 26A to 26H are arranged substantially along the inner peripheral edge 17B" represents, for example, the following cases in which:

(1) an imaginary line that connects portions facing the inner peripheral edge 17B of visible outlines of the holes 26A to 26H is substantially similar to or congruent with the inner peripheral edge 17B; or (2) an imaginary line (hereinafter referred to as a center arrangement line) that connects centers of the holes 26A to 26H adjacent to each other substantially coincides with the inner peripheral edge 17B. The case (2) indicates, for example, the following states (a) to (c) and the like, in which:

(a) all of the holes 26A to 26H are located in the inner peripheral edge 17B, and the center arrangement line substantially coincides with the inner peripheral edge 17B;

(b) centers of the holes 26A to 26H are scattered inside and outside the inner peripheral edge 17B, and the center arrangement line substantially coincides with the inner peripheral edge 17B; or (c) centers of the holes 26A to 26H are located outside the inner peripheral edge 17B, and the center arrangement line substantially coincides with the inner peripheral edge 17B.

Figure 10:
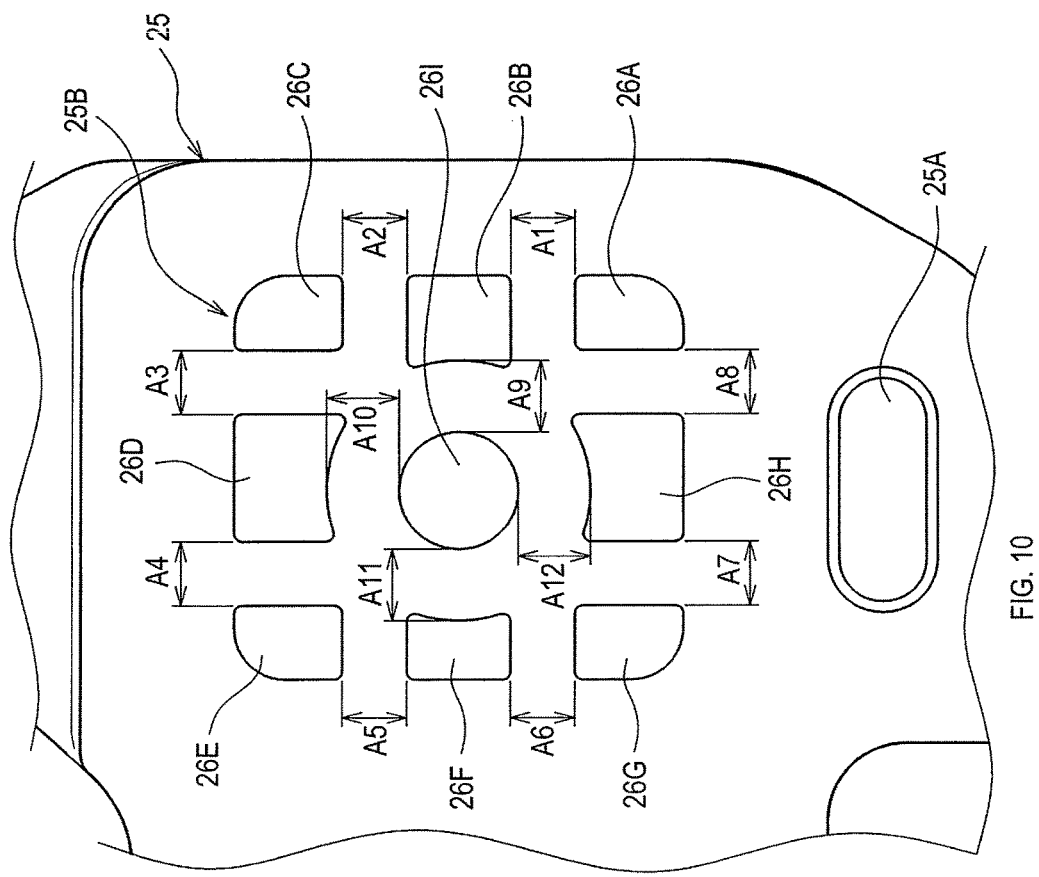
FIG. 10 is a view showing the load receiving portion of the first pressure-receiving spacer according to the embodiment.

In the holes 26A to 26H (hereinafter referred to as peripheral holes 26A to 26H) arranged substantially along the inner peripheral edge 17B, among the holes 26A to 26I, intervals A1 to A8 of the holes adjacent to each other in their arrangement direction are substantially the same as shown in FIG. 10.

The hole other than the peripheral holes 26A to 26H among the holes 26A to 26I, that is, the hole 26I (hereinafter referred to as the center hole 26I) is provided on the centroid side of the figure drawn by the inner peripheral edge 17B. Intervals A1 to A12 of the holes adjacent to each other including intervals A9 to A12 between the center hole 26I and the peripheral holes 26A to 26H are substantially the same.

The center hole 26I according to the present embodiment configures a screw hole of the P screw 27A. Therefore, at least the center hole 26I is a circular hole. The P screw 27A is a tapping screw. Therefore, before the P screw 27A is inserted into the center hole 26I, there is no internal thread formed on an inner peripheral surface of the center hole 26I.

The peripheral holes 26A to 26H are holes formed into a substantially rectangular shape. This is to make the imaginary line connecting the portions facing the inner peripheral edge 17B of the visible outlines of the peripheral holes 26A to 26H similar to or congruent with the inner peripheral edge 17B.

Portions of the peripheral holes 26A to 26H that face the center hole 26I are curved so as to draw a circular arc of which the center of curvature is the center hole 26I. This is to make the intervals A1 to A12 of the holes adjacent to each other including the intervals A9 to A12 between the center hole 26I and the peripheral holes 26A to 26H substantially the same.

3. Features of Back Frame and Driving Device According to the Present Embodiment <Plate Fixing Structure>

In the present embodiment, as described above, the side impact load acting on the first side frame 9 is transmitted to the second side frame 11 via the transmission rod 17, the plate 27, the first pressure-receiving spacer 25 and the second pressure-receiving spacer 29. Therefore, even when a large side impact load acts on the back frame 7 from the seat width direction, a back frame 7 that can withstand the side impact load can be obtained.

Since the plate 27 made of metal is fixed to the first pressure-receiving spacer 25, no load directly acts on the resin-made first pressure-receiving spacer 25, and the first pressure-receiving spacer 25 is reinforced with metal. Therefore, mechanical strength of the first pressure-receiving spacer 25 including the plate 27 can be improved.

The P screw 27A is positioned in the inner peripheral edge 17B of the transmission rod 17 projected onto the plate 27. Thus, it is possible to inhibit the transmission rod 17 from interfering with the P screw 27A when the transmission rod 17 is in contact with the plate 27.

Since the entire leading end 17A in the extending direction of the transmission rod 17 can be reliably brought into contact with the plate 27, the side impact load acting on the first side frame 9 can be reliably transmitted to the second side frame 11.

In the P screw 27A according to this embodiment, the center position of the cross section thereof substantially coincides with the centroid of the figure drawn by the inner peripheral edge 17B. Thereby, for example, even when the transmission rod 17 is tilted, the entire leading end 17A in the extension direction of the transmission rod 17 can be reliably brought into contact with the plate 27.

The first pressure-receiving spacer 25 is provided with the protrusion 25A protruding toward the plate 27, and the plate 27 has the hole 27B into which the protrusion 25A fits. The protrusion 25A and the hole 27B are located outside the outer peripheral edge 17C of the transmission rod 17 projected onto the plate 27. Thereby, an assembling worker can fix the plate 27 to the first pressure-receiving spacer 25 with the P screw 27A in a state in which the plate 27 is positioned by the protruding portion 25A and the hole 27B.

Since the hole 27B into which the protrusion 25A is fitted is provided on the plate 27, even if the transmission rod 17 is largely inclined, for example, the leading end 17A in the extending direction of the transmission rod 17 does not interfere with the protrusion 25A. Therefore, the entire leading end 17A in the extending direction of the transmission rod 17 can be reliably brought into contact with the plate 27.

The cross-sectional shape of the protrusion 25A and the hole portion 27B is oval. As a result, rotational displacement of the plate 27 is restricted by the protrusion 25A and the hole 27B. Therefore, the assembling worker can fix the plate 27 to the first pressure-receiving spacer 25 in a state in which the plate 27 is reliably positioned.

<Structure of First Pressure-Receiving Spacer>

The side impact load transmitted to the first pressure-receiving spacer 25 via the transmission rod 17 acts on the load receiving portion 25B of the first pressure-receiving spacer 25. Therefore, a portion of the load receiving portion 25B, which is parallel to a load direction, needs to have a sufficient thickness to withstand the side impact load.

However, when the thickness of the load receiving portion 25B is significantly different from that of the other portions, mold shrinkage occurs in the load receiving portion 25B during resin molding. It may be difficult to ensure sufficient mechanical strength.

On the other hand, the load receiving portion 25B according to the present embodiment is provided with the holes 26A to 26I depressed toward the second side frame 11, and the peripheral holes 26A to 26H are arranged substantially along the inner peripheral edge 17B of the transmission rod 17 projected onto the inner peripheral edge 17B.

As a result, it is possible to inhibit the thickness of the load receiving portion 25B from being significantly different from that of the other portion. Thus, mold shrinkage can be inhibited. Sufficient mechanical strength can be ensured in the resin-made load receiving portion 25B.

In the peripheral holes 26A to 26H, the intervals A1 to A8 of the holes adjacent to each other in the arrangement direction are substantially the same. This makes it possible to reliably inhibit mold shrinkage.

In the holes 26A to 26I, the intervals A1 to A12 of the holes adjacent to each other including the intervals between the center hole 26I and the peripheral holes 26A to 26H are substantially the same. This makes it possible to reliably inhibit mold shrinkage.

OTHER EMBODIMENTS

For example, the center position of the cross-section of the P screw 27A may be displaced from the centroid.

For example, the following configurations can be employed as well, in which: (a) the protrusion 25A and the hole 27B are eliminated; (b) the protrusion 25A and the hole 27B are in the inner peripheral edge 17B; and (c) the protrusion 25A is provided on the plate 27, and the hole 27B is provided in the first pressure-receiving spacer 25.

The protrusion 25A and the hole 27B are not limited to an oval shape as long as the shape can exhibit a rotation prohibiting function such as a polygonal shape, for example.

For example, a configuration in which the plate 27 is eliminated, a configuration in which the P screw 27A is arranged outside the figure drawn by the inner peripheral edge 17B, and the like, can be also employed.

In the peripheral holes 26A to 26H, the intervals A1 to A8 of the holes adjacent to each other in the arrangement direction may not be substantially the same.

In the holes 26A to 26I, the intervals A1 to A12 of the holes adjacent to each other including the intervals between the center hole 26I and the peripheral holes 26A to 26H may not be substantially the same.

For example, a configuration in which the peripheral holes 26A to 26H are eliminated, a configuration in which the peripheral holes 26A to 26H are arranged without following the inner peripheral edge 17B and the like, can be also employed.

For example, an imaginary line that connects the portions facing the inner peripheral edge 17B of the visible outlines of the holes 26A to 26H may be located in the inner peripheral edge 17B.

The first pressure spacer 25 may be directly fixed to the second side frame 11.

For example, the first pressure-receiving spacer 25 may be fixed to the lower panel 15, and the first pressure-receiving spacer 25 may be fixed indirectly to the second side frame 11 through the lower panel 15.

For example, the transmission rod 17 may be fixed only to the lower panel 15.

For example, the plate 27 may be fixed to the first pressure-receiving spacer 25 by a rivet.

For example, the transmission rod 17 may be a round pipe, a solid round bar, or the like.

In the above-described embodiment, since the figure drawn by the inner peripheral edge 17B is substantially rectangular, intervals between the center hole 26I and the peripheral holes 26A, 26C, 26E, 26G (hereinafter, referred to as diagonal position intervals), for example, had to be larger than the other intervals A1 to A12.

However, the present disclosure is not limited to this. That is, at least two of all the intervals may be substantially the same, and all the intervals including the diagonal position intervals may be substantially the same.

Specifically, the following configurations may be employed in which, (a) the figure drawn by the peripheral edge 17B is circle, and all the intervals are substantially the same; and (b) the center hole 26I and the peripheral holes 26A, 26C, 26E, 26G have a shape in which all the intervals are substantially the same.

In the above-described embodiment, the explanation has been made about the front seat of the passenger car. However, application of the present disclosure is not limited to this, and the present disclosure can be applied to a seat of other cars, and a seat for use in a vehicle such as railway vehicles, ships, aircrafts, and the like.

Furthermore, the present disclosure is not limited to the above-described embodiments as long as the present disclosure meets the gist of the invention recited in the claims. Thus, a configuration may be used that combines at least two embodiments among the plurality of embodiments described above.

What is claimed is:

1. A back frame for a vehicle seat, the back frame being applied to a vehicle seat having a seatback, the back frame configuring a frame of the seatback, the back frame comprising:
    a first side frame extending in a substantially up-down direction;
    a second side frame spaced apart from the first side frame in a seat width direction and extending in the substantially up-down direction;
    a transmission rod extending in an extending direction from the first side frame toward the second side frame, the transmission rod comprising a leading end closest to the second side frame in the extending direction, the transmission rod configured to transmit a load acting on the first side frame to the leading end; and
    a resin-made pressure-receiving spacer coupled to the second side frame at a position facing the leading end, having a load-receiving portion facing the leading end in the extending direction, and configured to receive the load from the leading end,
    the load-receiving portion comprising at least two peripheral holes depressed toward the second side frame being arranged substantially along an inner peripheral edge of the leading end projected onto the load receiving portion.

2. The back frame for a vehicle seat according to claim 1, wherein intervals between the at least two peripheral holes adjacent to each other in an arrangement direction are substantially the same.

3. The back frame for a vehicle seat according to claim 2, wherein the load receiving portion further comprises at least one center hole provided closer to a centroid side of a figure drawn by the inner peripheral edge than the at least two peripheral holes, and
    wherein intervals between the at least one center hole and the at least two peripheral holes adjacent to each other are substantially the same.

4. The back frame for a vehicle seat according to claim 3, further comprising:
    a metal plate disposed between the pressure-receiving spacer and the leading end,
    wherein the transmission rod is a hollow pipe,
    wherein the plate is fixed to the pressure-receiving spacer by a rod-like mechanical fastener, and
    wherein the mechanical fastener is inserted into the at least one center hole.

5. A driving device for a vehicle seat, the driving device being attached to a back frame for the vehicle seat, the back frame comprising: a first side frame; a second side frame spaced apart from the first side frame in a seat width direction, and a transmission rod extending in an extending direction from the first side frame toward the second side frame, the transmission rod comprising a leading end closest to the second side frame in the extending direction, the transmission rod configured to transmit a load acting on the first side frame to the leading end, the driving device being fixed to the second side frame and generating a force to swing the back frame, the driving device comprising:
    an electric motor that generates a driving force;
    a deceleration mechanism that decelerates a rotational output of the electric motor;
    a resin-made pressure-receiving spacer coupled to the deceleration mechanism at a position facing the leading end, having a load-receiving portion facing the leading end in the extending direction, and configured to receive the load from the leading end,
    the load-receiving portion comprising at least two peripheral holes depressed toward the second side frame being arranged substantially along an inner peripheral edge of the transmission rod projected onto the load receiving portion.

6. The driving device for a vehicle seat according to claim 5,
    wherein intervals between the at least two peripheral holes adjacent to each other in an arrangement direction are substantially the same.

7. The driving device for a vehicle seat according to claim 6,
    wherein the load receiving portion further comprises at least one center hole provided closer to a centroid side of a figure drawn by the inner peripheral edge than the at least two peripheral holes, and wherein intervals between the at least one center hole and the at least two peripheral holes adjacent to each other are substantially the same.

8. The driving device for a vehicle seat according to claim 7, further comprising:
a metal plate disposed between the pressure-receiving spacer and the leading end,
wherein the transmission rod is a hollow pipe,
wherein the plate is fixed to the pressure-receiving spacer by a rod-like mechanical fastener, and
wherein the mechanical fastener is inserted into the at least one center hole.

* * * * *